United States Patent [19]

De Torre

[11] 4,382,397
[45] May 10, 1983

[54] SHEAR WHEEL FOR CUTTING FABRIC

[76] Inventor: Robert P. De Torre, 321 Barclay Ave., Pittsburgh, Pa. 15221

[21] Appl. No.: 215,274

[22] Filed: Dec. 11, 1980

[51] Int. Cl.³ .............................................. B26D 1/20
[52] U.S. Cl. ...................................... 83/508; 83/675; 83/676
[58] Field of Search .......... 83/676, 675, 430, 607–609, 83/500–503, 694, 332, 333, 425, 508

[56] References Cited

U.S. PATENT DOCUMENTS

| Re. 29,268 | 6/1977 | Kuts | 83/676 X |
|---|---|---|---|
| 1,123,532 | 1/1915 | Heynau | 83/676 |
| 1,796,463 | 3/1931 | Kaltenbach et al. | 83/676 X |
| 2,626,664 | 1/1953 | Regele | 83/694 X |
| 3,055,249 | 9/1962 | Lord | 83/676 X |
| 3,180,194 | 4/1965 | Locke | 83/607 X |
| 3,798,767 | 3/1974 | Rizer et al. | 83/676 X |
| 4,075,919 | 2/1978 | Komura et al. | 83/676 |
| 4,080,856 | 3/1978 | Shearon | 83/694 X |
| 4,275,630 | 6/1981 | Goldsmith et al. | 83/675 X |
| 4,276,798 | 7/1981 | Gottschalk | 83/430 |

Primary Examiner—Frank T. Yost

[57] ABSTRACT

Pieces of fabric e.g. tire cord fabric are cut using a rotary shear wheel having a grooved periphery. A land extends about the periphery of the shear wheel adjacent the groove. The land may be larger in diameter than the cutting edge.

14 Claims, 6 Drawing Figures

# 4,382,397

SHEAR WHEEL FOR CUTTING FABRIC

BACKGROUND OF THE INVENTION

This invention relates to a shear wheel for cutting fabrics e.g. tire cord fabric.

DISCUSSION OF PRIOR ART

In general, prior art rotary shear wheels have either 90° angle cutting edges or relief angle cutting edges (less than 90°). One of the problems associated with the 90° angle cutting edges is that the wear is faster than a relief angle cutting edges. Another problem is that the 90° angle cutting edges may mar the fabric material during cutting by the opposite unused cutting edge of the wheel. The problem with the relief angle cutting edges is that only one side of the wheel is used. A problem associated with both types of angle cutting edges is that debris builds up especially when cutting tire fabric because the fabric is covered with uncured rubber.

In view of the above, it would be advantageous to have a rotary shear wheel that does not have problems discussed above.

SUMMARY OF THE INVENTION

A solution to the above problems may be obtained with this invention. This invention relates to a rotary shear wheel having a grooved or hollowed peripheral cutting surface adjacent a peripheral land. The grooved or hallowed cutting edge improves the cutting life by introducing a sharper cutting angle to the material and also, the land surface adjacent to the groove keeps the fabric away from the opposite cutting edge. The land also holds the fabric horizontal while the hollow surface forming one of the cutting edges shears or cuts the material thus preventing debris from forming around the cutting edge. This is especially true when cutting rubber like materials such as tire cord. The land, usually larger in diameter than the cutting edge, prevents marring of the material by the opposite unused edge. Hollow grooves allow the blade to be reversed for additional cutting surfaces on each side of the land. Further, resharpening the sides of the wheel by removing stock from the side of the wheel and resharpening the grooves reduces the land. However, the wheel can still be used for cutting fabric.

DESCRIPTION OF THE INVENTION

Figure 1:
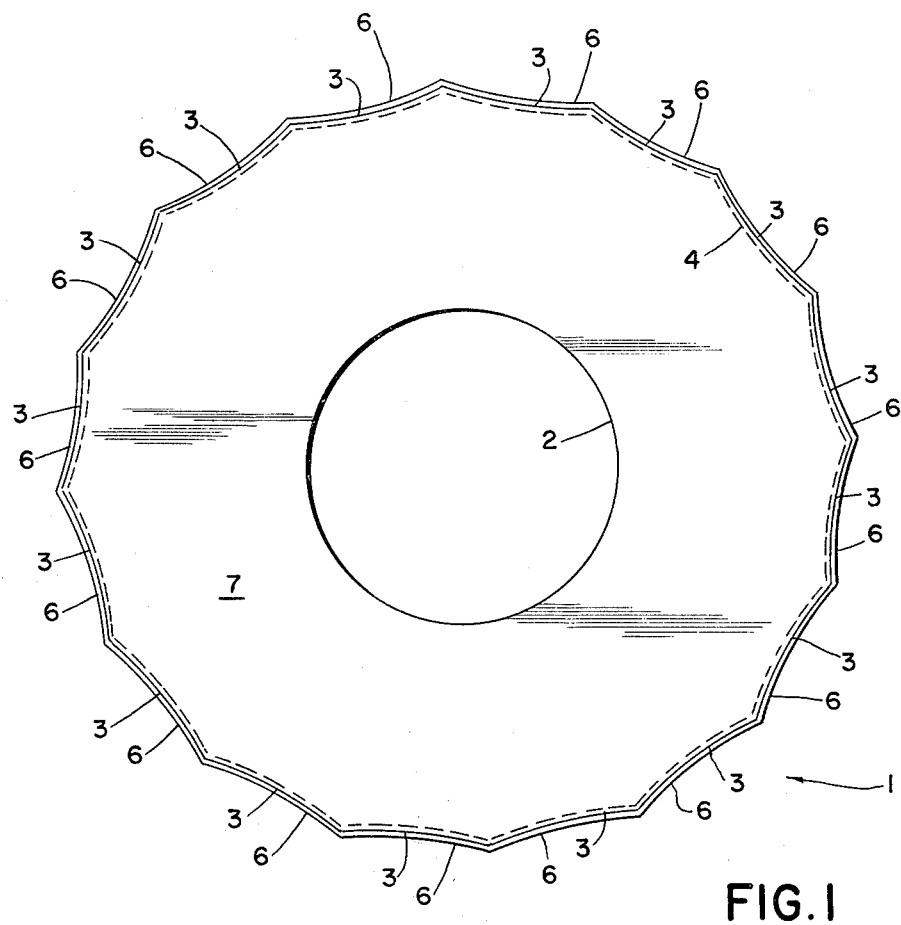
FIG. 1 is an elevated front view of a shear cutting wheel of the invention.
Figure 2:
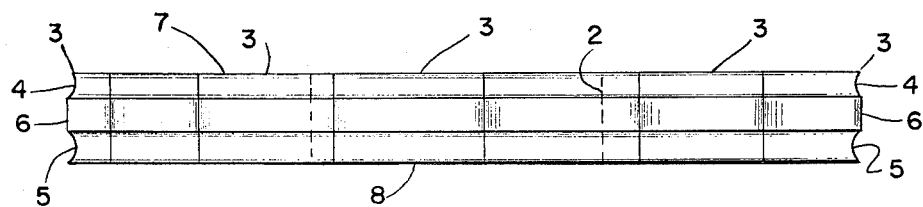
FIG. 2 is a side view of the wheel in FIG. 1.

Shown in FIGS. 1 and 2 is a rotary shear or cutting wheel 1. The wheel or disc 1 has an axial center bore 2 for mounting the wheel 1 on a shaft of a rotary shear bias cutter of the type used in the art. The elevated front view as shown in FIG. 1 illustrates the wheel 1 with a plurality of projecting arcuate or scalloped rim segments about the periphery. As shown in FIG. 2, the wheel 1 has peripheral grooves 4 and 5 about peripheral land 6. The grooves 4 and 5 preferably are continuous and form the peripheral cutting edges 3 at the intersection of the side 7 and 8 with adjacent grooves 4 and 5 respectively.

Figure 3:
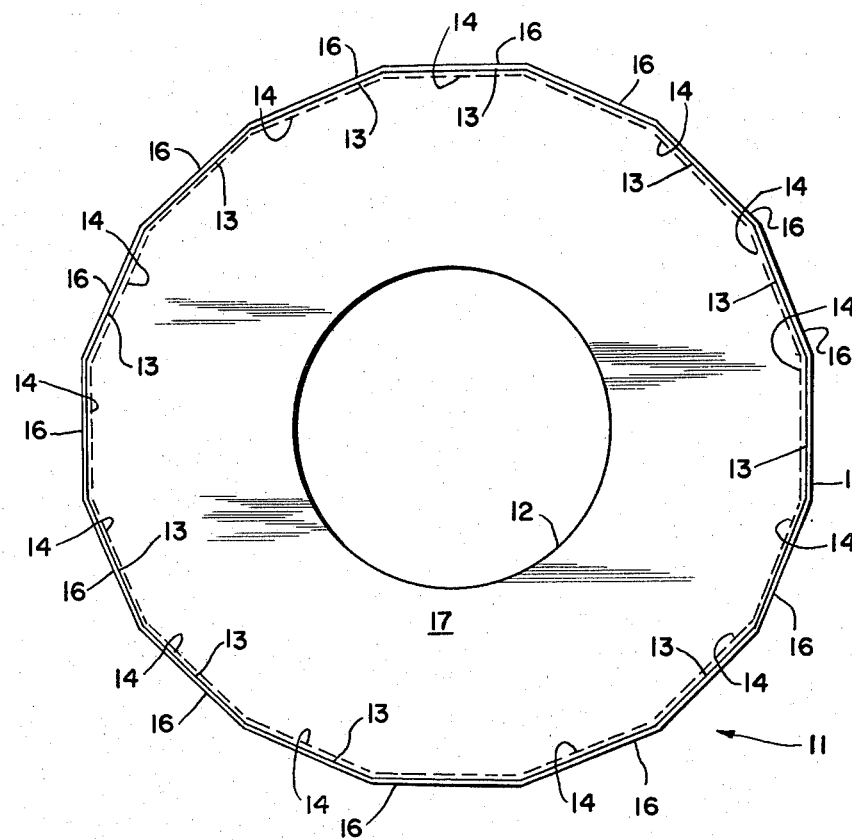
FIG. 3 is an elevated front view of another shear wheel of the invention.
Figure 4:
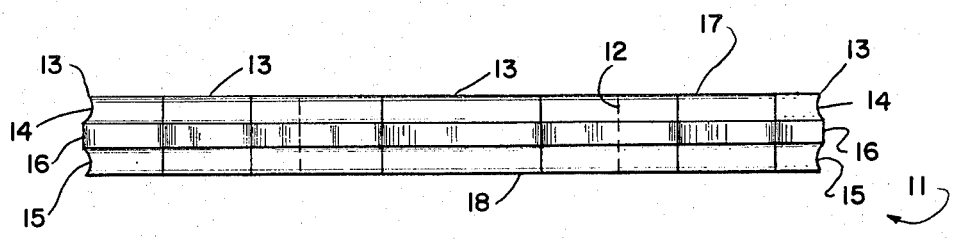
FIG. 4 is a side view of the wheel in FIG. 3.

Shown in FIGS. 3 and 4 is a rotary shear or cutting wheel 11. The wheel 11 has a center bore 12 for mounting the wheel 11 on a shaft of a rotary shear bias cutter of the type used in the art. The elevated front view as shown in FIG. 3 illustrates the wheel 11 with a plurality of projecting segments and cutting edges 13 about the periphery. As shown in FIG. 4 the wheel 11 has peripheral grooves 14 and 15 about land 16. The grooves 14 and 15 preferably are continuous and form the cutting edges 13 at the intersection of the side 17 and 18 with adjacent grooves 14 and 15 respectively.

Figure 5:
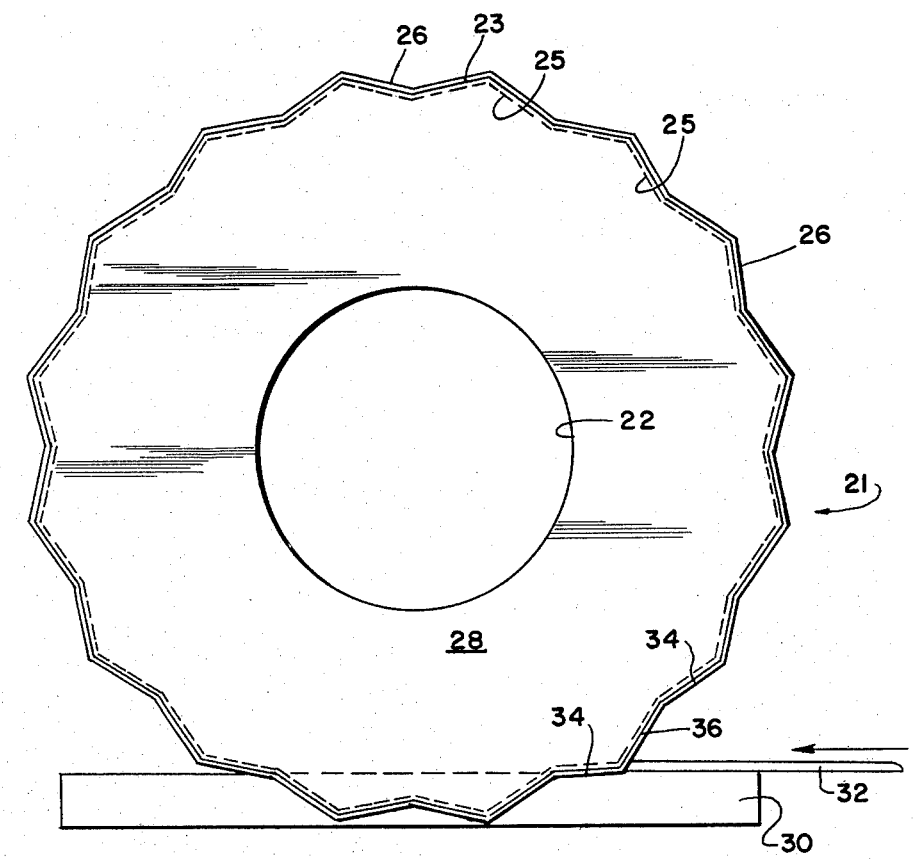
FIG. 5 is an elevated front wiew of another shear wheel of the invention.
Figure 6:
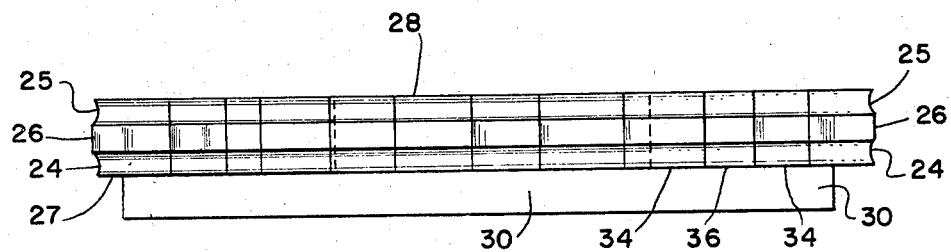
FIG. 6 is a side view of the wheel in FIG. 5.

Shown in FIGS. 5 and 6 is a rotary shear or cutting wheel 21. The wheel 21 has a center bore 22 for mounting the wheel 21 on a shaft of a rotary shear bias cutter of the type used in the art. The elevated front view as shown in FIG. 5 illustrates the wheel 21 with a plurality of projecting lobes or saw tooth cutting edges 23 about the periphery. As shown in FIG. 6 the wheel 21 has peripheral grooves 24 and 25 about peripheral land 26. The grooves 24 and 25 preferably are continuous and form the cutting edges 23 at the intersection of the side 27 and second side 28 with adjacent grooves 24 and 25 respectively.

The wheels 1, 11 and 21 can be used on right handed or left handed machines. The wheels can be used to cut fabric using the cutting edges at one side of the wheel and then reversed. For example, and referring to FIGS. 5 and 6 a bed knife 30 is mounted adjacent the wheel side 7. The fabric is cut as the cutting edges rotate past the bed knife. After a time period, the wheel can be reversed. In other words side 8 of the wheel is adjacent the bed knife.

The grooves 4, 5, 14, 15, 24 and 25 need not be continuous but are on the portion of the periphery used for cutting. For example and with reference to FIG. 5 material e.g. tire cord 32 (shown only in FIG. 5) is moved from right to left and the wheel rotates in a clockwise direction. Moving in this direction the surface 34 of the cutting edge does the severing. After a time period the bed knife 30 is adjusted for the wheel rotating in a counterclockwise direction and the cloth moving from left to right, or the wheel is mounted on a machine having the material moving from left to right viewed in FIG. 5 to sever the fabric 32 using cutting edges 36.

The wheels of the invention can be used with only one groove along side a land. However, using two grooves and a land therebetween permits reversing of the wheel, as discussed above, without debris collecting on the rim cutting edge, e.g. the cutting edge formed at the intersection of the side of the wheel and adjacent groove. However, one groove and a land allow also for wheel reversal in which cutting with one side takes advantage of the groove and cutting with the opposite side is similar to the prior art 90° or relief angle cutting edge. The land prevents marking of the surface of the tire cord as it is being cut because the land adjacent the cutting edge is preferably higher or has a larger diameter, thereby moving the fabric away from the opposite cutting edge.

The wheel can be made in any manner. For example and referring to FIGS. 5 and 6, a 16 lobe type solid carbide wheel having a 2½" bore and 6" Dia. and ½" thick. On the peripheral surface grooves 24 and 25 of a radius of 1" and a 3/16" land 26 therebetween are formed. The grooves can be any dimension or shape eg. a depression formed by a radius or V-shape or flats adjacent and spaced below the land. The larger the radius the smaller the land for a given wheel thickness. The land surface produced is slightly greater in diameter than the cutting edge. This assures the material will not be marred on the unused edges. The principle of the invention can be used on straight edge shear cutters, e.g. a straight member pivoted at one end or also for a guillotine type. The groove and land combination or groove-land-groove combination may be used. Further, the land can be coated with a release coating.

The groove may extend from one cutting edge to the other. For example FIGS. 3 and 4 would have one groove replacing grooves 14 an 15 and land 16. In this case the debris would not collect on the cutting edge but may mar the material from the unused cutting edge.

The grooves of the invention prevent debris pickup because during cutting the material is supported at the cutting edge and other adjacent surface of which can be the land or other edge or surface which provides a space between the fabric and the bottom of the groove. For the groove-land-groove rim there is a space between the fabric and bottom of the groove and after the cut, the material is further spaced from the cutting edge by the higher land.

The wheels are usually rotated at a speed greater than the speed of fabric when both are compared to linear displacement. This speed results in debris building up on the prior art wheels.

I claim:

1. A rotary shear circular disc having a side, a plurality of projecting segments disposed about the periphery of the disc, each of said segments having a peripheral land and a peripheral groove, the groove being disposed between the land and the side and intersecting the side to form a peripheral cutting edge therewith.

2. The rotary shear of claim 1 wherein the land extends beyond the periphery of the cutting edge.

3. The rotary shear of claim 1 wherein the projecting segments are formed by flats about the periphery.

4. The rotary shear of claim 1 wherein the projecting segments are lobes.

5. The rotary shear of claim 1 wherein the projecting segments are arcuate or scalloped.

6. The rotary shear of claim 1 wherein the disc has a center bore.

7. The rotary shear of claim 1 wherein the disc has a second side and each of said segments has a second peripheral groove disposed between the land and said second side and intersecting said second side to form a second peripheral cutting edge, the land extending outwardly beyond both cutting edges.

8. A device suitable for cutting tire cord fabrics comprising a bed knife, a rotatable shear wheel mounted for rotation about an axis and adjacent the bed knife, the shear wheel comprising a circular disc having a side, a plurality of projecting segments disposed about the periphery of the disc, each of said segments having a peripheral land and a peripheral groove, the groove and the side intersecting to form a peripheral cutting edge, the shear wheel and the bed knife mounted so that the cutting edges pass said bed knife when the wheel is rotated.

9. The device of claim 8 wherein the segments project radially outwardly from said axis.

10. The device of claim 9 wherein the disc has a second side and each of said segments has a second peripheral groove disposed between the land and said second side to form a second peripheral cutting edge.

11. The device of claim 10 wherein the land extends radially outwardly beyond the cutting edges.

12. The device of claim 10 wherein the projecting segments are formed by flats about the periphery.

13. The device of claim 10 wherein the projecting segments are lobes.

14. The device of claim 10 wherein the projecting segments are arcuate or scallopd.

* * * * *